(12) United States Patent  (10) Patent No.: US 9,783,216 B2
Alden et al.  (45) Date of Patent: Oct. 10, 2017

(54) GAS CYLINDER CART SECURABLE TO GAS GRILL

(71) Applicants: J. Michael Alden, Palatine, IL (US); Paul Robert Behnke, Mount Prospect, IL (US); Douglas William Masek, Downers Grove, IL (US)

(72) Inventors: J. Michael Alden, Palatine, IL (US); Paul Robert Behnke, Mount Prospect, IL (US); Douglas William Masek, Downers Grove, IL (US)

(73) Assignee: WEBER-STEPHEN PRODUCTS, LLC, Palatine, IL (US)

( * ) Notice: Subject to any disclaimer, the term of this patent is extended or adjusted under 35 U.S.C. 154(b) by 614 days.

(21) Appl. No.: 14/288,744

(22) Filed: May 28, 2014

(65) Prior Publication Data

US 2015/0342401 A1    Dec. 3, 2015

(51) Int. Cl.
*F24B 3/00* (2006.01)
*B62B 1/16* (2006.01)
*A47J 37/07* (2006.01)
*B62B 5/00* (2006.01)
*B62B 1/12* (2006.01)

(52) U.S. Cl.
CPC ............. *B62B 1/16* (2013.01); *A47J 37/0704* (2013.01); *B62B 1/12* (2013.01); *B62B 5/0079* (2013.01); *B62B 2202/022* (2013.01); *B62B 2207/02* (2013.01)

(58) Field of Classification Search
CPC ........ A47J 37/0786; B62B 1/16; B62B 1/008; B62B 1/12
See application file for complete search history.

(56) References Cited

U.S. PATENT DOCUMENTS

| | | | | |
|---|---|---|---|---|
| 4,217,073 A * | 8/1980 | Propst | .................... | D06F 95/002 |
| | | | | 220/811 |
| 5,109,834 A * | 5/1992 | Collins | ............... | A47J 37/0786 |
| | | | | 126/25 R |
| 5,458,309 A | 10/1995 | Craven, Jr. | | |
| 6,148,668 A | 11/2000 | Sieg | | |
| 6,293,273 B1 * | 9/2001 | Byrne | .................... | B62B 1/264 |
| | | | | 126/276 |
| 8,347,874 B2 | 1/2013 | Bruno | | |
| 2003/0047178 A1 * | 3/2003 | Barth | .................. | A47J 37/0713 |
| | | | | 126/41 R |
| 2005/0162055 A1 * | 7/2005 | Bienick | .................. | A47B 57/48 |
| | | | | 312/408 |

* cited by examiner

*Primary Examiner* — Jason Lau
(74) *Attorney, Agent, or Firm* — Vitale Vickrey Niro & Gasey

(57) ABSTRACT

A securable cart assembly for a gas grill that allows easy transport and installation, and which permits the cart and associated gas cylinder tank to cooperate with and be secured to a gas grill assembly.

2 Claims, 4 Drawing Sheets

GAS CYLINDER CART SECURABLE TO GAS GRILL

FIELD OF THE INVENTION

The present inventions relate generally to gas grills. More particularly, the present inventions relate to a cart assembly for a gas cylinder tank that allows easy transport of the gas cylinder tank and which permits the cart and associated gas cylinder tank to cooperate with and be secured to a gas grill assembly.

BACKGROUND OF THE INVENTION

Gas grills typically include a cooking chamber and a supporting frame assembly having legs, braces and the like. The frame assembly typically includes wheels, so that the grill may be more easily moved. The grill frame assembly may also include side tables, which may optionally include a gas burner for increased cooking area. Typical gas grills are fueled using well known refutable cylindrical gas tasks filled with liquid propane or other combustible material. For safety reasons, many jurisdictions require that the gas cylinders be secured to the grill during use. Accordingly, most gas grills include a means to secure the gas cylinder to a portion of the grill frame. In some grills, the gas cylinder is secured to the grill or grill frame using a tank scale which is attached to the exterior of a side of the frame. A typical tank scale to secure and/or suspend the tank may be found in U.S. Pat. No. 6,148,668, assigned to Weber-Stephen Products LLC. In addition to securing the gas cylinder to the grill, a tank scale is a device indicating the amount of fuel remaining in the gas cylinder. However, the use of a tank scale to support the gas cylinder on the grill frame is not required. For example, the gas cylinder may be secured to the grill frame by a single bracket or other means well known to those of ordinary skill in the art (see e.g., U.S. Pat. No. 5,458,309). Depending upon the grill, the tank scale or other means to secure the gas cylinder may be located inside the grill frame and any cabinet that is part of the grill frame (see, for example, U.S. Pat. No. 8,347,874 assigned to Weber-Stephen Products LLC).

A commonly experienced difficulty with gas pills is changing and transporting the gas cylinders tanks. When full, a cylinder widely used is the U.S. (called a twenty pound cylinder) weighs approximately forty pounds. It can be difficult for many users to transport a full cylinder, for example, from a car to the grill. It can be equally difficult for a user to lift the full gas cylinder and place it on a tank scale or other means to secure and suspend the gas cylinder to the grill frame. In addition to feeling heavy, the gas cylinders are relatively cumbersome and difficult to carry, even when empty. Moreover, in gas grills having a cylinder attached to the grill frame under a side table, securing a full gas cylinder and even removing an empty gas cylinder is made more difficult because of the confined space and awkward angle. Thus, there is a need for a device to aid in the transportation and installation of gas cylinders for use with gas grills, while at the same time enabling the gas cylinder to be secured to the grill in compliance with typical safety regulations.

SUMMARY OF THE INVENTION

The present inventions preserve the advantages of known gas grills and gas cylinder tank transport carts and provide new features, advantages and benefits not previously available. In particular, the present inventions provide a cart or dolly to which the gas tank is secured for easy transportation and also enable the cart (along with the associated gas tank) to be releasably secured to the grill frame assembly and/or side table.

In a preferred embodiment of the present invention, a gas cylinder cart assembly securable to a gas grill assembly is provided. The gas grill assembly includes a frame assembly having a lower frame member and a side table. The securable cart assembly includes a generally horizontal platform member; a generally vertical member attached at a substantially right angle to the platform member; and, a pair of wheels attached to the approximate apex of the platform member and the vertical member. The cart assembly further includes an upper east engagement member attached to an upper end of the vertical member; a gas cylinder suspension member attached to an intermediate portion of the vertical member to which the gas cylinder is attached; and, a lower cart engagement member which is attached to the horizontal platform member of the cart. The grill assembly includes a lower cart support assembly which is attached to the lower frame member of the grill and which cooperates with the lower cart engagement member of the cart; and, an upper cart support member attached to the side table of the grill that cooperates with the upper cart engagement member of the cart. In a preferred embodiment, the lower cart support assembly of the pill may include a rod capable of being engaged by the lower cart engagement member of the cart. In addition, the upper cart support member may be in the form of a hook shaped member capable of engaging the upper cart engagement member which is on the vertical member of the cart. In an optional embodiment, the gas cylinder suspension member may be a tank scale. In addition, the lower cart support assembly may include two opposing brackets to secure the rod to the lower frame member of the grill and the upper cart support member may include two hooks and the upper cart engagement member may include two posts that are engaged by the two hooks.

The present inventions also provide for a gas grill assembly using a gas cylinder tank as a fuel source and a cooperating gas cylinder cart which is securable to the grill assembly. The grill assembly includes a cooking chamber and a frame assembly supporting the cooking chamber. The frame assembly includes a lower frame portion and a side table; an upper cart support member attached to the side table; and, a lower cart support assembly attached to the lower frame portion. A generally L-shaped cast assembly having a substantially horizontal platform portion and a substantially vertical member and a pair of wheels at or near the apex of the horizontal platform and vertical member is also provided. Also included is an upper cart engagement member attached to the substantially vertical member of the cart which is capable of engagement with the upper cart support member; a lower cart engagement member attached to the substantially horizontal platform member of the cart which is capable of engagement with said lower cart support assembly; and, a gas cylinder suspension member attached to said substantially vertical member of said cart which is capable of securing said tank on said cart. The lower cart support assembly is preferably a rod which is parallel to the lower frame portion and positioned between two opposing brackets which in turn are attached to the lower frame portion. The lower cart engagement member is preferably a u-shaped (inverted) loot attached to the underside of the substantially horizontal platform portion of the cart and the upper cart support member attached to the side table is preferably a hook. In addition, the upper cart engagement member attached to the substantially vertical member of the cart may include at least one post. In a preferred embodiment, the gas cylinder suspension member is a gas cylinder tank scale.

The present inventions further provide for a gas grill assembly having a gas cylinder tank as a fuel source and a cooperating securable gas cylinder tank cart assembly. The grill assembly includes a cooking chamber and a lid; a grill frame assembly supporting the cooking chamber, wherein the grill frame assembly includes a lower frame portion and a side table. An upper cart support member attached to the side table, wherein the upper cart support member includes a hook-shaped component and a lower cart support assembly attached to the lower frame portion of the grill frame assembly, wherein the lower cart support assembly includes a rod, are also provided. Also included is a generally L-shaped securable cart assembly having a pair of wheels, the cart assembly including a platform portion and a generally vertical portion; an upper cart engagement member attached to the generally vertical member, the upper cart engagement member including a post that cooperates with the hook-shaped component of the upper cart support member; a lower cart engagement member attached to a forward portion of the platform portion of the cart, wherein the lower cart engagement portion includes a u-shaped component that cooperates with the rod of the lower cart support assembly; and, a gas cylinder tank suspension member attached to the vertical member of the cart assembly which is capable of securing the gas cylinder tank. The gas cylinder tank suspension member may be a tank scale.

Accordingly, it is an object of the present inventions to provide a cart assembly for assisting in the transportation and installation of a gas cylinder tank for a gas grill.

It is another object of the present inventions to provide a cart for a gas cylinder tank wherein the gas cylinder is supported on the cart, either on a platform portion of the cart or from a suspension member attached to the vertical member of the cart and wherein the cart may be secured to the grill and/or frame assembly.

It is an additional object of the present inventions to provide a cart that can support a gas cylinder using a tank scale or other fuel level indicator.

It is a further object of the present inventions to provide a gas cylinder cart that may be secured to the grill or grill frame for use.

It is also an object of the present inventions to provide a gas cylinder cart that may be secured to the grill frame at two locations.

It is yet another object of the present inventions to provide a gas cylinder cart to aid in the installation and transportation of gas cylinders while at the same time enabling the gas cylinder, via the cart, to be secured to the grill or grill frame assembly.

INVENTOR'S DEFINITION OF THE TERMS

The following terms which may be used in the various claims and/or specification of this patent are intended to have their broadest meaning consistent with the requirements of law.

As used herein, "gas grill" or "grill assembly" shall mean any cooking device having a cooking chamber and a portable gas fuel source in a tank such as liquid propane, butane and the like.

As used herein, "grill frame" or "grill frame assembly" shall mean those components used to support a gas grill. The grill frame typically includes a plurality of frame members, such as structural tubing, panels and/or doors that may be metal, plastic or other suitable material or combination thereof. The grill frame may include casters or wheels for portability. Grill frame or grill frame assembly as used herein shall also include at least one side table which may optionally include a burner.

As used herein, "gas cylinder" or "gas cylinder tank" refers to a portable source of fuel for a gas grill that is typically a tank made from metal and which is generally cylindrically shaped, includes a foot, handle, valve and the like to regulate the release of fuel. Gas cylinders are typically refillable with liquid propane (LP) or other flammable liquids under pressure.

Where alternative meanings are possible, in either the specification or claims, the broadest meaning is intended. All words used in the claims are intended to be used in the normal, customary usage of grammar, the trade and the English language.

BRIEF DESCRIPTION OF THE DRAWINGS

The stated and unstated objects, features and advantages of the present inventions (sometimes used in the singular, but nut excluding the plural) will become apparent from the following descriptions and drawings, wherein like reference numerals represent like elements in the various views, and in which.

DETAILED DESCRIPTION OF PREFERRED EMBODIMENTS

Set forth below is a description of what is currently believed to be the preferred embodiments or best representative examples of the inventions claimed. Future and present alternatives and modifications to the embodiments and preferred embodiments are contemplated. Any alternatives or modifications which make insubstantial changes in function, purpose, structure or result are intended to be covered by the claims of this patent.

Figure 1:
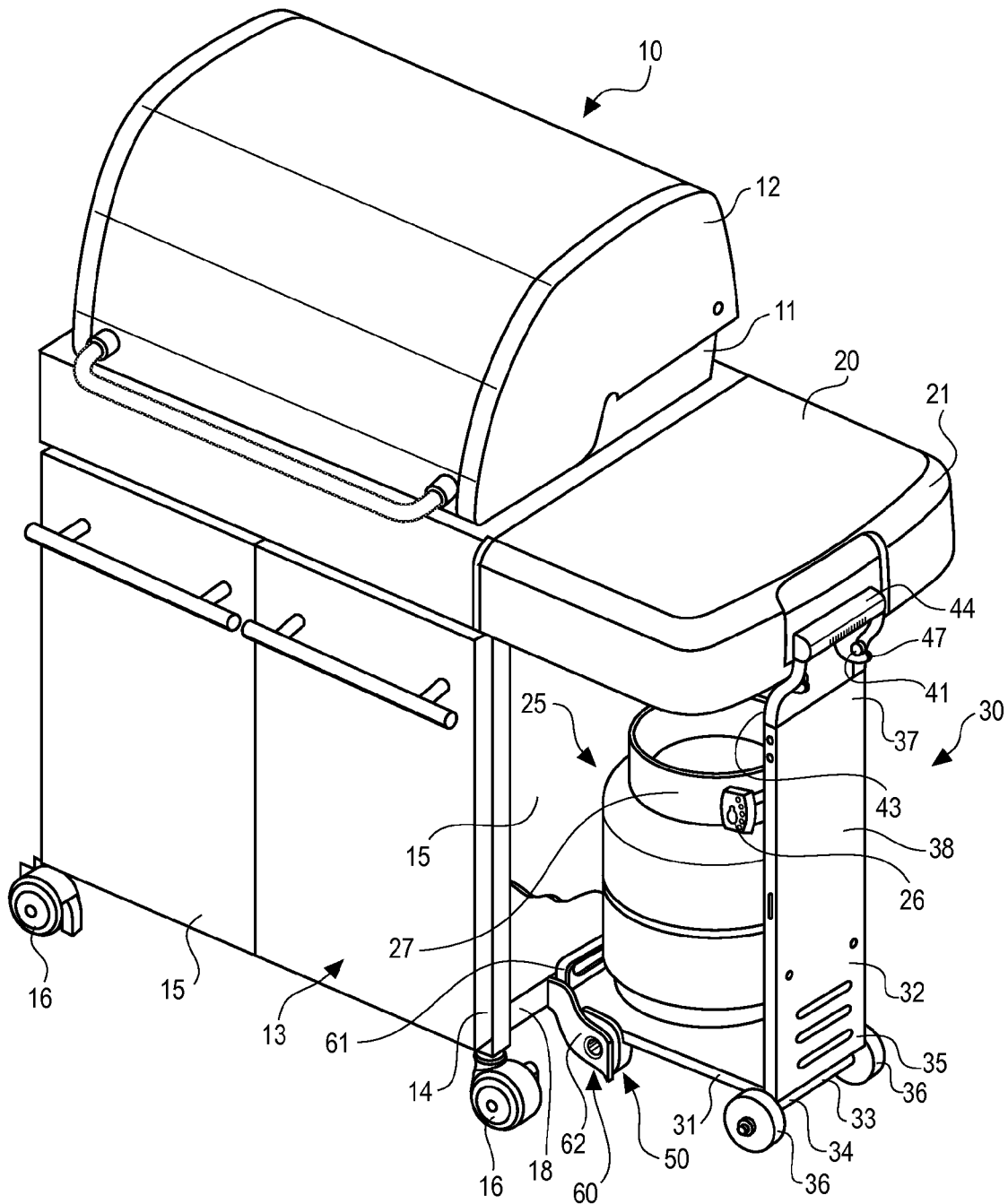
FIG. 1 is a perspective view of a preferred embodiment of the securable gas cart of the present inventions shown secured to the frame assembly of a typical gas grill for use.

A preferred embodiment of the present inventions may be seen by reference to FIG. 1, which shows the preferred components and assemblies in an installed position for use. The inventions include a gas grill assembly 10, a gas cylinder tank 25 and a gas cylinder cart assembly 30. Grill assembly 10 includes a cooking chamber 11 having a lid 12, as well as gas distribution components such as burners, valves and the like (not shown). The grill assembly 10 is supported by grill frame assembly 13. For ease of reference, the cart assembly 30 which is secured to the grill frame assembly 13, will be referred to as securable cart assembly 30.

Frame assembly 13 typically includes legs 14, braces and may include cabinet members 15 and casters or wheels 16. A lower frame member 18 is also provided, along with a side table 20 having an end trim piece 21. It will be understood by those of ordinary skill in the art that grill frame assembly 13 may be constructed of a variety of materials, such as plastic, metal or a combination thereof. Side table 20 may also be constructed of a variety of materials or combination of materials, as will also be understood by those of skill, in the art. Although not shown, side table 20 and any end trim piece 21 is typically structurally secured to and/or is part of grill frame assembly 13. As a result, it is able to support securable cart assembly 30 as hereinafter described. It will be further understood by those of skill in the art that it is not necessary to have a formal side table 20 for the present inventions. Instead, frame members (not shown) that extend from the side of the grill assembly 10 or grill frame assembly 13 may be satisfactory to support the upper portion of securable cart assembly 30 as hereinafter described.

Figure 2:
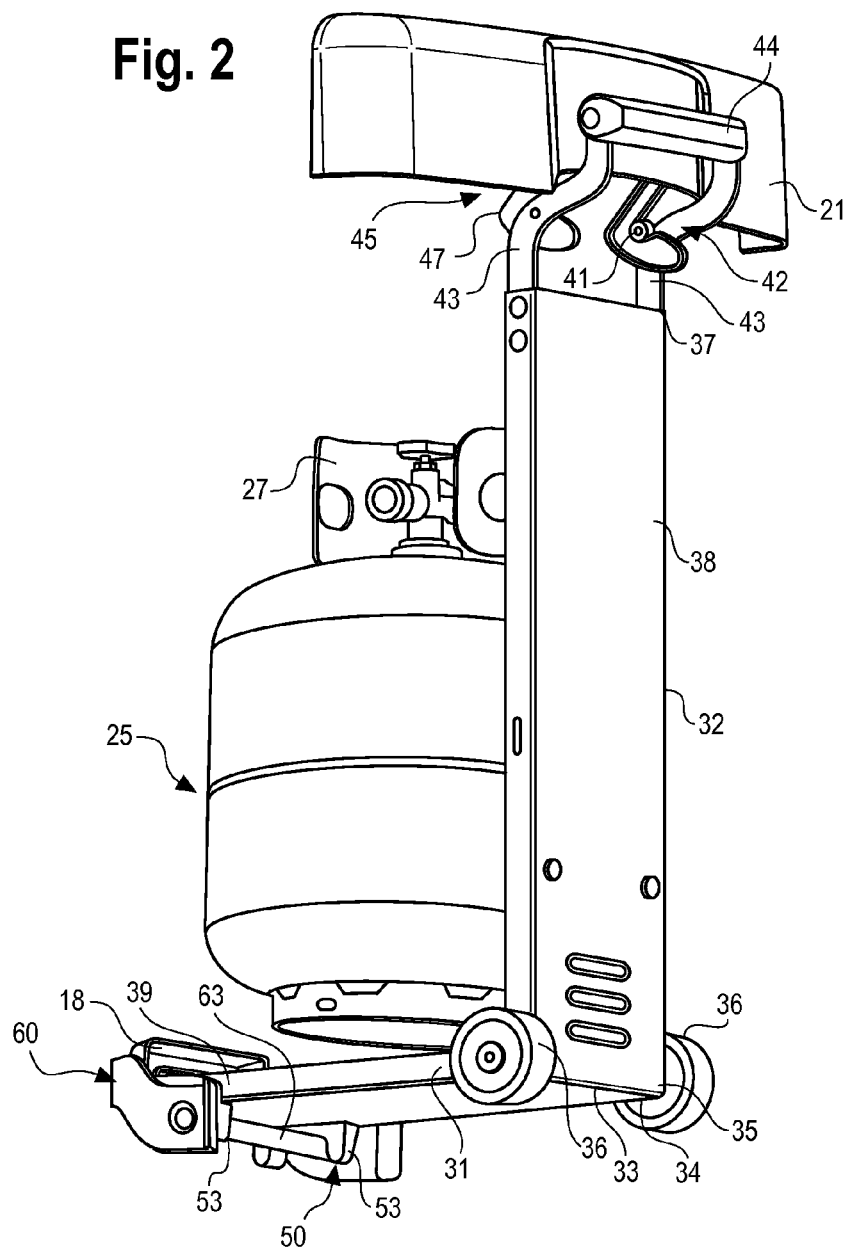
FIG. 2 is a perspective view of the preferred securable gas cart of FIG. 1 showing the preferred upper and lower cart engagement members of the cart assembly engaged with the preferred upper and lower cart support members on the grill frame assembly.
Figure 6:
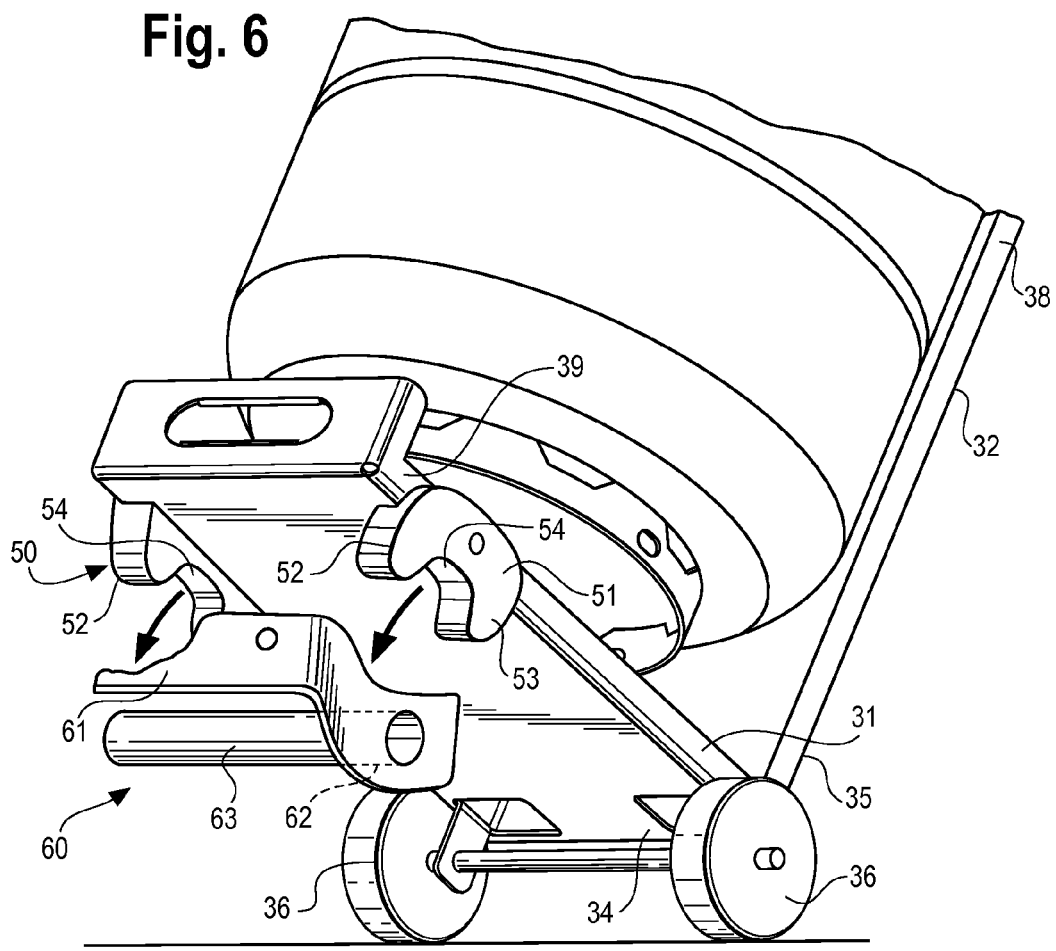
FIG. 6 is a partial perspective view of a preferred lower cart engagement member of the cart assembly shown prior to installation on the preferred lower curt support member.

Referring to FIGS. 1, 2 and 6, securable cart assembly 30 is generally L-shaped and includes a generally horizontal platform member 31 and a generally vertical member 32. The rear end 34 of platform 31 and lower end 35 of vertical member 32 form a generally perpendicular apex 33. Platform 31 includes a front portion 39 and vertical member 32 includes a top portion 37 and an intermediate portion 38. It will be understood by those of skill in the art that platform 31 and vertical member 32 may be separate components attached to each other by well known means or may be integrally formed from a single piece of suitable material. A pair of wheels 36 are provided at or near the apex 33 and may be rotatably attached to securable cart assembly 30 by a variety of methods that will be understood by those of skill in the art. It will be appreciated that the basic structural components of securable cart 30 are similar to a typical dolly or hand truck (see also FIG. 2). Thus, it will be understood by those of skill in the art that vertical and horizontal are descriptive terms and that platform member 31 is not always generally horizontal and generally vertical member 32 is not always generally vertical, especially when in transport mode. When securable cart assembly 30 is installed and/or at rest, those components will typically be in that general orientation relative to a flat surface.

As best shown in FIGS. 1, 2 and 6, in a preferred embodiment, gas cylinder tank 25 is secured to the inside of vertical member 32 using a typical tank scale 26 by tank ring 27 (see FIG. 1). In this manner, gas cylinder tank 25 is attached to cart assembly 30 and suspended from tank scale 26. Because gas cylinder tank 25 may be placed on tank scale 26 outside of the confines of the side table 20 and grill assembly 10, it may be easily installed and uninstalled. Cart assembly 30 is then attached to the grill assembly 10 as hereinafter described. It will be understood by those of skill in the art that although preferred, a tank scale 26 is not required. Other hangers and clips may be used consistent with the present inventions. In addition, the gas cylinder tank may simply rest on platform member 31.

Having described the basic components of the grill assembly 10, grill frame assembly 13 and securable cart assembly 30, other aspects of the present inventions may better be seen by reference to FIGS. 2-6. In general, and in order to install and secure securable cart 30 to the grill frame assembly 13, each of the assemblies 30 and 13 are provided with components that cooperate with each other as hereinafter described.

Figure 3:
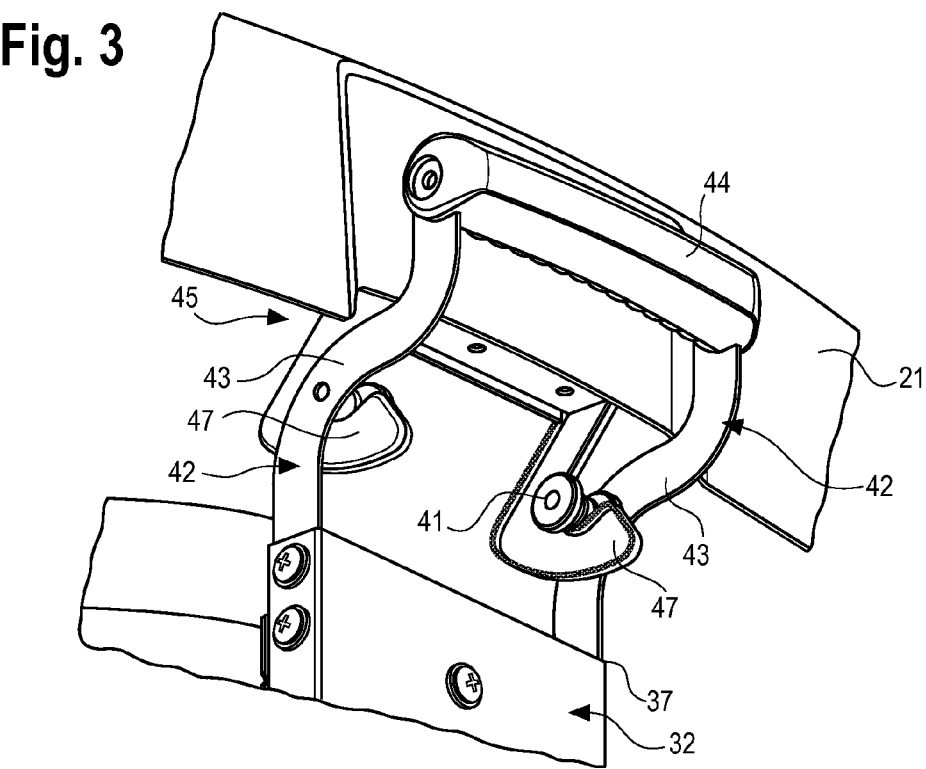
FIG. 3 is a perspective view of a preferred embodiment of the upper cart engagement member of the cart assembly engaged by a preferred upper cart support member on the grill frame assembly.
Figure 4:
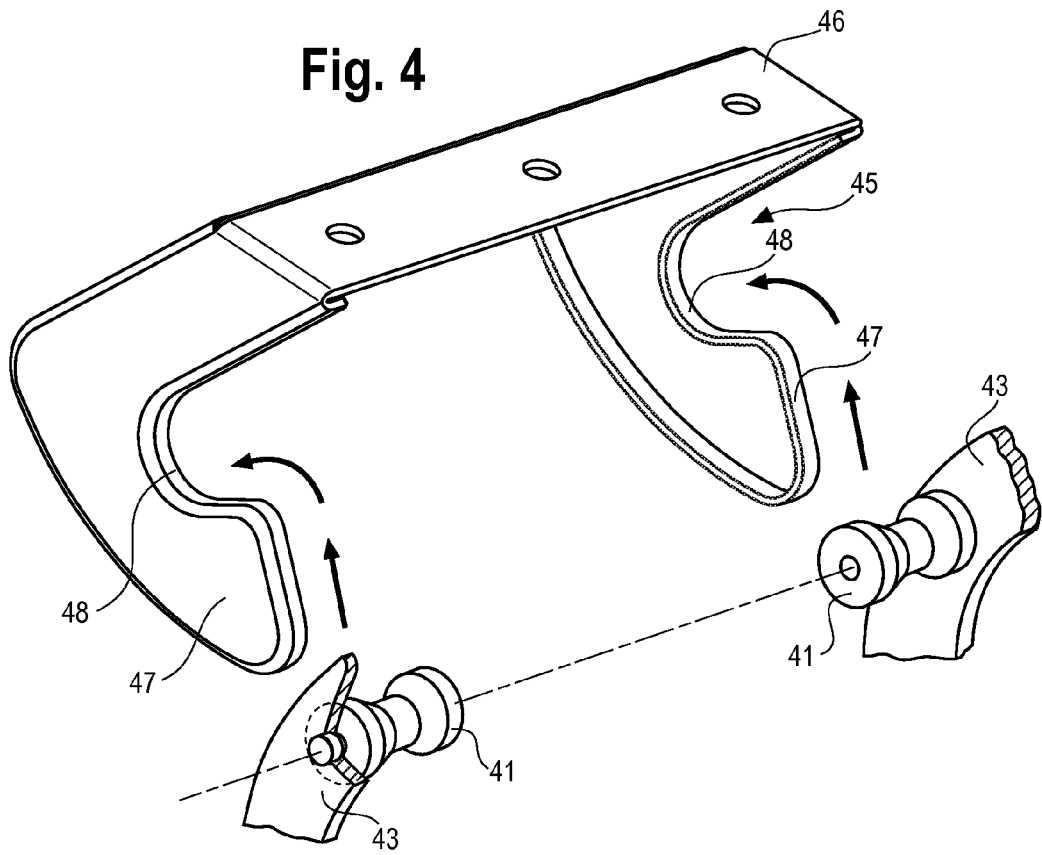
FIG. 4 is an exploded view of the upper cart engagement member and upper cart support bracket of FIG. 3 shown prior to engagement.

More specifically and by reference to FIG. 2-4, the upper end 37 of vertical member 32 is provided with an upper cart engagement member 40. As shown in FIG. 4, in a preferred embodiment, upper cart engagement member 40 is formed from two posts 41. In a preferred embodiment, the upper end 37 of vertical member 32 is provided with a handle 42 having two opposing offset members 43 and a grip 44. As shown in FIGS. 3 and 4, posts 41 are attached to opposing members 43. Also as shown, handle 42 is offset so that it clears side table 20 and/or end trim piece 21, as will be understood by those of skill in the art. If will also be understood that handle 42 and opposing members 43 may be separate components or made part of vertical member 32. In addition, handle 42 is not required, as upper cart engagement member 40 may be attached to vertical member 32.

It will be further understood by those of skill in the art that upper cart engagement member 40 may take a variety of forms. For example, a single rod (not shown) between the two opposing offset members 43 may be used. In addition, a single post 41 may be used. Moreover, the post 41 or posts 41 do not have to be cylindrical as shown and may take a variety of forms consistent with the present inventions. All that is required is that they may be engaged by upper cart support member 45 as hereinafter described.

An upper cart support member 45 is also provided, as best shown in FIGS. 3 and 4. In a preferred embodiment, upper cart support member 45 is attached to the underside of side table 20 and/or to the inside of end trim piece 21. In a preferred embodiment, upper cart support member 45 includes an attachment flange 46 that may be bolted, welded, glued or otherwise affixed to the underside of side table 20, end trim piece 21 and/or an extending frame member (not shown). Preferably, there are two downwardly projecting hooks 47 having recesses 48. Hooks 47 are sized to accommodate posts 41 to releasably secure and support upper cart engagement member 40. It will be understood by those of skill in the art that upper cart support member 45 may take a variety of forms consistent with the present inventions. For example, two hooks 47 are not required, as only one would suffice. In addition, u-shaped members may be used. Still other forms will be understood by those of ordinary skill in the art.

Figure 5:
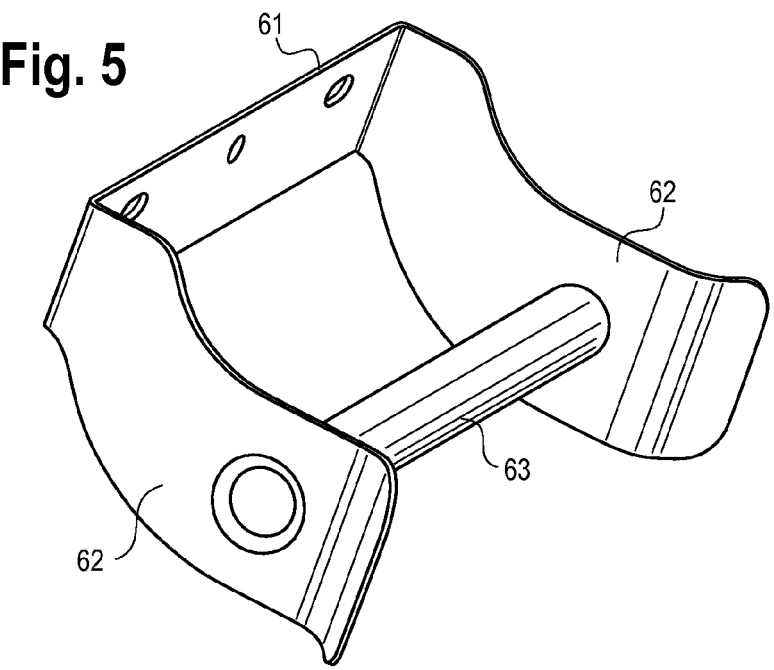
FIG. 5 is an exploded view of a preferred lower cart support member of the present inventions.

By reference to FIGS. 2, 5 and 6, the preferred lower cart engagement member 50 and lower cart support member 60 may be seen. More particularly, the front end 39 of horizontal platform 31 of cart 30 is provided with a lower cart engagement member 50. In a preferred embodiment, lower cart engagement member 50 is a generally u-shaped foot 51 having a from leg 52, a back leg 53 and a recessed portion 54. As will be understood by those of skill in the art, u-shaped piece 51 is attached to the front end 39 of platform 31 using any variety of well known means, including bolting, welding or riveting. For example, foot 51 may be attached to the sides of platform 31 as shown in FIG. 6. Alternatively, if may be attached to the underside of platform 31 or a combination of the two. Although two feet 51 are preferred, one foot 51 or more than two feet 51 may be used. Lower cat engagement member 50 is designed to cooperate with lower cart support member 60 as hereinafter described.

Figure 2A:
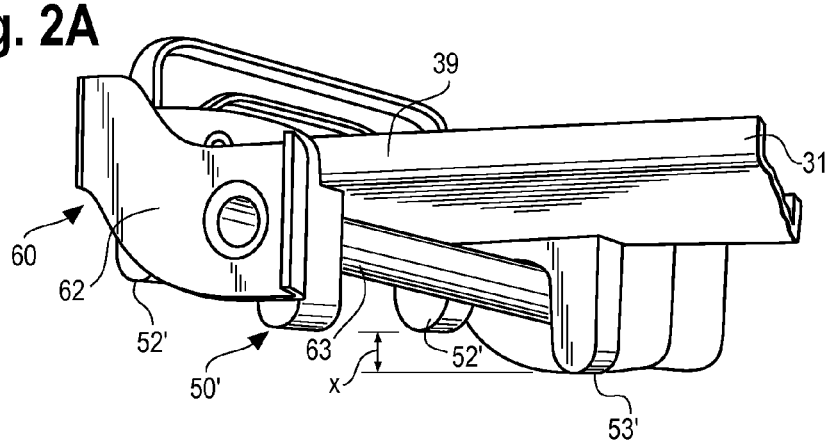
FIG. 2A is a perspective view of an alternative embodiment of the lower cart engagement member of the cart assembly shown engaged with a preferred lower cart support member.

An alternative embodiment of lower cart engagement member $50^1$ is shown in FIG. 2A. In tins embodiment, rear leg 53$^1$ is longer than from leg 52$^1$. This embodiment may be suitable when it is desired that securable cart assembly 30 rest in a more horizontal position when not engaged with lower cart support member 60.

By reference to FIGS. 5 and 6, in the preferred embodiment, lower cart support member 60 includes an attachment portion 61, two opposing flanges 62 and a rod 63 extending between flanges 62. Attachment portion 61 of lower cart support member 60 is attached to lower frame member 18 of frame assembly 13 with bolts, welds or other methods that will be understood by those of skill in the art. Rod 63 is sized to fit within the recess 54 of u-shaped feet 51. It will also be understood by those of skill in the art that lower cart support member 60 may take a variety of forms consistent with the present inventions.

Having described the principal components of the preferred embodiment, the use and operation of the present inventions will now be described. As an initial matter, cylinder gas tank 25 is typically placed on and suspended from tank scale 26 (or other suitable component) at a location remote from grill assembly 10. The user then tilts cart assembly 30 onto its wheels 36 (see FIG. 6) and the cart assembly 30 and gas cylinder tank carted to the desired location. While still in a tilted position, securable cart assembly 30 is aligned with the side of grill frame assembly 13. While still in a tilted position, u-shaped feet 51 of lower cart engagement member 50 are aligned with rod 63 of lower cart support member 60. Securable cart assembly 30 is then rotated downward such that the recessed portions 54 of feet 51 rest on rod 63. This secures the front of cart 30 to grill frame assembly 13.

To secure the upper portion of securable cart assembly 30, handle 44 is gripped by fee user and lifted upward. Lifting is made easier because lower cart engagement member 50 pivots about lower cart support member 60. As shown in FIGS. 3 and 4, posts 41 of upper cart engagement member 40 are then engaged by hooks 47 of upper cart support member 45. In this manner, securable cart assembly 30 is secured to grill frame assembly 13 in two places. When cylinder gas tank 25 is empty or the user otherwise desires to disengage securable cart assembly 30, the reverse of the foregoing is implemented.

The above description is not intended to limit the meaning of the words used in or the scope of the following claims that define the invention. Rather, it is contemplated that future modifications in structure, function or result will exist that are not substantial changes and that all such insubstantial changes in what is claimed are intended to be covered by the claims. Thus, while preferred embodiments of the present inventions have been illustrated and described, it will be understood that changes and modifications can be made without departing from the claimed invention. In addition, although the term "claimed invention" or "present invention" is sometimes used herein in the singular, it will be understood that there are a plurality of inventions as described and claimed.

Various features of the present inventions are set forth in the following claims.

What is claimed is:

1. A gas grill assembly using a gas cylinder tank as a fuel source and a cooperating gas cylinder cart securable to the grill assembly at two locations of the grill assembly comprising:

a cooking chamber;

a grill frame assembly supporting the cooking chamber, the grill frame assembly including a lower frame portion and a side table;

an upper cart support member attached to the side table wherein the upper cart support member attached to said side table includes at least one hook;

a lower cart support assembly attached to the lower frame portion of the grill assembly, the lower cart support assembly including a rod parallel to the lower frame portion and positioned between two opposing brackets which are attached to the lower frame portion;

a generally L-shaped gas cylinder cart having a substantially horizontal platform portion and a substantially vertical member and a pair of wheels at the apex of the horizontal platform and vertical member;

an upper cart engagement member including at least one post, the upper cart engagement member attached to the substantially vertical member of the cart which is capable of engagement with the hook of the upper cart support member;

a lower cart engagement member attached to the substantially horizontal platform member of the cart, the lower cart engagement member including an inverted u-shaped foot, a recessed portion of the foot pivotably engaging the rod of the tower cart support assembly;

a gas cylinder suspension member attached to said substantially vertical member of said cart which is capable of securing said tank on said cart; and, wherein the apex of the L-shaped gas cylinder cart may be pivoted upward about the u-shaped foot so that the at least one post of the upper cart engagement member may be engaged with the at least one hook of the upper cart support member, thereby providing two points of support of said L-shaped cart on said grill frame assembly, one at the upper cart support assembly and the other at the lower cart support assembly.

2. The gas grill and cooperating gas cylinder cart assembly of claim 1 wherein the gas cylinder suspension member is a gas cylinder scale.

* * * * *

UNITED STATES PATENT AND TRADEMARK OFFICE
CERTIFICATE OF CORRECTION

PATENT NO. : 9,783,216 B2
APPLICATION NO. : 14/288744
DATED : October 10, 2017
INVENTOR(S) : J. Michael Alden et al.

Page 1 of 1

It is certified that error appears in the above-identified patent and that said Letters Patent is hereby corrected as shown below:

In the Specification

Column 1, Line 21: "refutable cylindrical gas tasks" should read --refillable cylindrical gas tanks--
Column 1, Line 43: "gas pills" should read --gas grills--
Column 1, Line 45: "used is the U.S." should read --used in the U.S.--
Column 1, Line 51: "feeling heavy" should read --being heavy--
Column 2, Line 14: "upper east engagement" should read --upper cart engagement--
Column 2, Line 26: "assembly of the pill" should read --assembly of the grill--
Column 2, Line 46: "L-shaped cast assembly" should read --L-shaped cart assembly--
Column 2, Line 63: "loot attached" should read --foot attached--
Column 4, Line 23: "but nut" should read --but not--
Column 4, Line 50: "lower curt support" should read --lower cart support--
Column 6, Line 16: "If will also" should read --It will also--
Column 6, Line 54: "from leg" should read --front leg--
Column 6, Line 60: "if may be" should read --it may be--
Column 6, Line 63: "Lower cat engagement" should read --Lower cart engagement--
Column 6, Line 67: "In tins embodiment" should read --In this embodiment--
Column 7, Line 1: "from leg" should read --front leg--
Column 7, Line 33: "by fee user" should read --by the user--

In the Claims

Column 8, Line 37, Claim 1: "tower cart" should read --lower cart--

Signed and Sealed this
Fourteenth Day of November, 2017

Joseph Matal
*Performing the Functions and Duties of the
Under Secretary of Commerce for Intellectual Property and
Director of the United States Patent and Trademark Office*